United States Patent [19]
Dietrich et al.

[11] Patent Number: 5,731,640
[45] Date of Patent: Mar. 24, 1998

[54] CONVERTER FOR CHANGING ROTARY MOVEMENT TO AXIAL MOVEMENT

[75] Inventors: Johannes Dietrich, Gilching; Bernd Gombert, Grafrath; Bertram Willberg, Fürstenfeldbruck, all of Germany

[73] Assignee: Deutsche Forschungsanstalt fur Luft- und Raumfahrt e.V., Köln, Germany

[21] Appl. No.: 758,572

[22] Filed: Dec. 3, 1996

[30] Foreign Application Priority Data

Dec. 5, 1995 [DE] Germany .................. 195 45 379.4

[51] Int. Cl.$^6$ ........................................ H02K 41/00
[52] U.S. Cl. .................. 310/12; 310/20; 310/19; 310/31; 310/36
[58] Field of Search .................. 310/31, 12, 20, 310/80; 475/149; 318/115, 113

[56] References Cited

U.S. PATENT DOCUMENTS

| | | | |
|---|---|---|---|
| 4,050,554 | 9/1977 | Scheffel | 188/203 |
| 4,531,419 | 7/1985 | Botz et al. | 74/388 |
| 4,546,298 | 10/1985 | Wickham et al. | 318/374 |
| 5,086,900 | 2/1992 | Kikuta et al. | 192/142 R |
| 5,518,462 | 5/1996 | Yach | 475/149 |

FOREIGN PATENT DOCUMENTS

| | | | |
|---|---|---|---|
| 1286363 | 1/1969 | Germany | 310/12 |
| 3739059 | 5/1989 | Germany | 310/12 |

*Primary Examiner*—Thomas M. Dougherty
*Assistant Examiner*—Elvin G. Enad
*Attorney, Agent, or Firm*—Browdy and Neimark

[57] ABSTRACT

A device (1) for converting rotary movement into axial movement has a spindle (8), a spindle nut (5) surrounding the spindle (8), and a plurality of interposed rollers (7). Each of the rollers has a groove profile (72) corresponding to a thread (81) on the spindle (8), and roller grooves (71) corresponding to spindle grooves (51) formed on the interior of the spindle nut (5). The converter device is driven by a drive unit such as an electric motor (4), either via the elements spindle nut (5) and spindle (8) or, with an interposed connection element, via the rolling elements or rollers (7). The converter device has a reset device with a mechanical energy accumulator (21) and an energy delimiter (22). Energy transfer takes place from the electric motor (4) via the energy delimiter (22) to the energy accumulator (21) connected to a casing (3) or vice versa.

12 Claims, 12 Drawing Sheets

CONVERTER FOR CHANGING ROTARY MOVEMENT TO AXIAL MOVEMENT

FIELD OF THE INVENTION

The present invention relates to motion converters for converting rotary motion into linear motion.

BACKGROUND OF THE INVENTION

German patent DE 38 63 172 discloses a device for converting fast rotary movement into slow axial movement, resulting in a high increase in force. This device, hereinafter referred to as a converter device, comprises a spindle, rolling elements or rollers, and a spindle nut. The central spindle has an exterior thread, which may be a fine thread, and is surrounded in a planet-type arrangement by rolling elements or rollers numbering, for example, 6. Each has a groove profile comprised of adjacent, parallel grooves, or a left-handed or right-handed thread, corresponding to and fitting the thread of the spindle. The individual planet rollers additionally have coarse guide grooves, for example with a V-shaped cross section, corresponding to and engaging with female guide grooves formed on the interior of the spindle nut.

With this type of device, very high forces can be generated which, in the past, could only be generated with hydraulic systems.

With a converter device based on this known design or a similar design, a linear axial movement of one of the elements of the converter device is transferred to a piston serving as an operating cylinder, analogous to the operation of hydraulic systems. An application of this type would be applicable, for example, in pumps, valves, brakes, relays and dampers.

In order to use the above device as a substitute for hydraulic systems in, for example, brakes, the axial movement of one of the converter device elements must be effectively carried out in the opposite direction when a power outage occurs. A respective safeguard against power outages is known from DE AS 1 286 363. The safeguard against power outages described therein is used for electric servomotors with self-locking reducing gears. Additionally, an accessory drive comprising a spring tension device is provided between the electric servomotor and the element to be adjusted by it.

During a power outage, energy stored in an energy accumulator is released, and a fork head is moved into a preferred safety position. The energy accumulator is designed in the form of a compression spring. This compression spring is compressed when the safety device is actuated and subsequently held in place by an electromagnetically actuated, spring-weighted blocking lever. During a power outage, the magnetic effect of the electromagnet subsides and the spring-weighed blocking lever releases the compression spring and thus the energy accumulated in the compression spring, resulting in the fork head being moved into a preferred safety position.

The safety device for servomotors described above has the particular disadvantage that it represents an additional, external device with a complex mechanical design.

SUMMARY OF THE INVENTION

The object of the invention is therefore to improve a device for converting rotary movement into axial or linear movement so that if the device for converting rotary movement into axial movement is driven by an electric motor, the actuator is effectively reset when the device is disconnected from its power source.

This object is attained according to the invention with a converter device having a reset device.

In an advantageous improvement of the invention, the reset device has an energy accumulator and a mechanical energy delimiter. The energy accumulator is charged during actuation of the converter device and the energy delimiter prevents the energy accumulator from being overcharged or damaged.

According to a preferred design of the converter device with reset device, the rotary movement of the spindle nut, which is rotatably mounted inside a casing and is driven by an electric motor, is converted into an axial movement of the spindle via the rolling elements or rollers; during this process, the electric motor applies pretension onto a torsion spring that is firmly connected to the casing and serves as an energy accumulator.

To prevent over-tensioning of the torsion spring, which could result in the torsion spring being damaged or destroyed, a friction clutch is provided between the motor shaft and the torsion spring to serve as an energy delimiter. Once the torsion spring has accumulated either the maximum amount of energy that can be accumulated in the torsion spring or a predetermined amount of energy, the friction clutch slips. This means that a certain number of motor revolutions can be stored in the torsion spring.

If the electric motor is disconnected from the power supply, for example because of a power outage, the torsion spring releases the accumulated energy to the motor shaft and turns it in a direction opposite to its previous direction of rotation. The spindle nut and the rolling elements or rollers are therefore also turned in a direction opposite to their previous direction of rotation, and the movement of the spindle is changed from its previous direction of movement into an axial movement.

The rotary movement of the spindle nut which is also driven by an electric motor is converted into an axial movement of the spindle via the rolling elements or rollers. According to a further advantageous design of the converter device with reset device, the motor shaft is directly connected to a torsion spring that is not firmly connected to the casing. The torsion spring is supported on the casing by the friction clutch. The friction clutch elements that either slip or firmly connect the friction clutch to the casing, depending on the amount of energy accumulated by the torsion spring, are thus located between the friction clutch and the casing. The adjustment of the amount of energy to be accumulated in the torsion spring (also the number of motor revolutions to be stored and the related reset when the motor is disconnected) is determined by the dimensions of the torsion spring and the predefined adhesion between the clutch element and the casing.

Further preferred designs of the converter device with reset device also have a driven spindle nut. However, the reset device comprising the torsion spring, clutch element and friction clutch is located between the spindle nut and the casing. Analogous to the designs described above, the torsion spring connected to the friction clutch may either be firmly connected to the casing, with the clutch element located between the friction clutch and the spindle nut, or the torsion spring connected to the friction clutch may instead be firmly connected to the spindle nut, whereby the clutch element must be located between the friction clutch and the casing.

In further advantageous designs of the converter device with reset device, the design of the reset device corresponds to the first two designs described above. However, the electric motor does not drive the spindle nut, but instead drives the spindle, so that the rotary movement carried out by the spindle is converted into an axial movement of the spindle nut together with the rolling elements or rollers.

The amount of energy to be accumulated, which corresponds to a certain number of motor revolutions, can be predefined by appropriately selecting the dimensions of the torsion spring and the predefined maximum adhesion between the motor shaft and the clutch element of the friction clutch, i.e., by predefining the precise force at which the clutch element is no longer engaged by the motor shaft. In correlation with the gear ratio increase or reduction within the device for converting rotary movement into axial movement, predefining the amount of energy to be accumulated also defines the distance along which the spindle will travel in the opposite direction from its previous direction of movement after the electric motor is disconnected from the power supply.

A further advantage of the converter device expanded according to the invention lies in the fact that the reset of the axially moved element of the converter device does not have to be carried out by reversing the poles of the electric motor.

A further advantage of the technical solution according to the invention is the fact that converter devices of this type, including reset devices, may be designed as very small units.

The converter device with reset device according to the invention may advantageously be used as a substitute for hydraulically or pneumatically actuated systems. The converter device with reset device according to the invention may furthermore advantageously be used in brake systems. The major advantage of using this converter device or a similarly designed converter device over hydraulic or pneumatic systems lies in the considerably reduced maintenance requirements due to the fact that no pressure-generating agents, such as oils or air, are used.

Also, the careful installation of hydraulic or pneumatic pipes required for safety reasons is no longer necessary since converter devices of the above type are generally driven by electric motors.

BRIEF DESCRIPTION OF THE DRAWING

The converter device with reset device is described in detail in the following based on the preferred designs under reference to the enclosed drawings, wherein each of FIGS. 1 to 12 is a partially schematic cross-sectional view of a respective preferred embodiment of the device of the present invention for converting rotary movement into axial movement for actuating drives with a reset device.

DETAILED DESCRIPTION OF THE PREFERRED EMBODIMENTS

Figure 1:
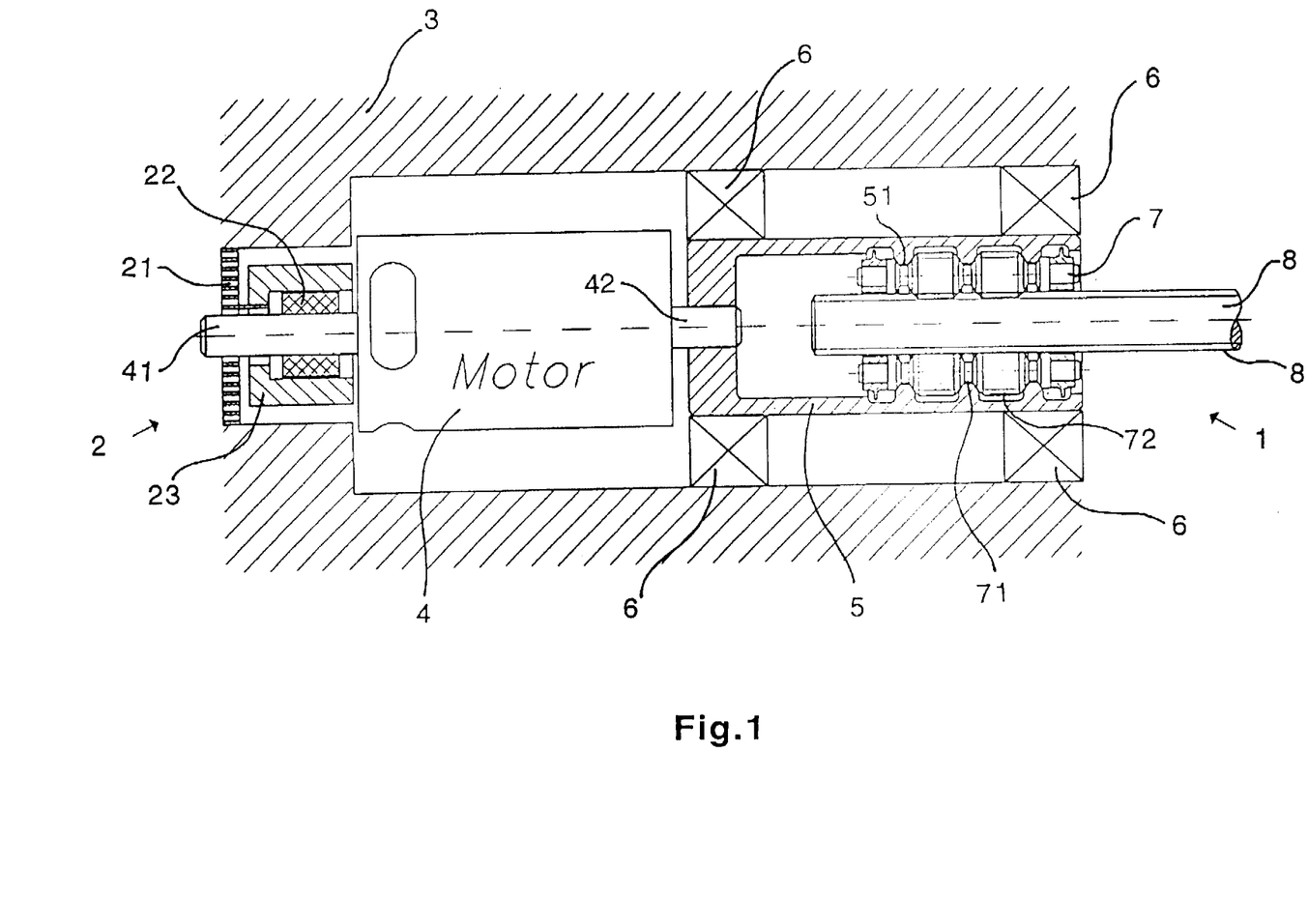

FIG. 1 shows a schematic sectional view of a first preferred embodiment of a device for converting rotary movement into axial movement according to the present invention, marked in its entirety with reference number 1 (for simplicity hereinafter referred to as converter device 1), for an actuating drive with a reset device 2 connected to a shaft 41 of a motor 4, for example in the form of an electric motor, and housed in a casing 3 shown as a hatched area. The converter device 1 has a spindle nut 5 connected to the shaft 42 of the motor 4, whereby the shaft 42 is rotatably mounted by means of bearings 6 in a casing 3, as well as rolling elements or rollers 7 and a spindle 8.

The rolling elements or rollers 7 have grooves 71 that engage into grooves 51 formed on the interior of the spindle nut to guide the rolling elements or rollers 7 inside the spindle nut 5 so that they can rotate both around their own axis as well as around the main axis of the device 1 but cannot be shifted in an axial direction. The rolling elements or rollers 7 also have grooves 72 that engage into a thread 81.

The motor 4 is firmly connected to the spindle nut 5 via the motor shaft 42. When the spindle nut 5 is turned by the electric motor 4, this rotary movement is transferred to the spindle 8 via the rolling elements or rollers 7, so that the spindle performs an axial movement.

The reset device 2 shown to the left of the motor 4 in FIG. 1 has an energy accumulator comprising a torsion spring 21, and an energy delimiter comprising a clutch element 22 and a friction clutch 23. The torque transmitted by the motor 4 via the motor shaft 41 is transferred to the frictionally engaged clutch element 22, from where the torque is transferred, also by friction, to the friction clutch 23, which is firmly connected to the torsion spring 21. The torsion spring 21 serves as the energy accumulator and is firmly connected to the casing 3.

The tension of the torsion spring 21, which increases with an increasing number of rotations of the motor shaft 41, produces a torque counteracting the torque of the motor 4. Once these opposite torques have reached the same level, the static friction between the clutch element 22 and the friction clutch 23 and the motor shaft 41 turns into a sliding friction, so that the friction clutch 23 no longer turns even if the motor shaft 41 continues to rotate. Consequently, the torsion spring 21 is no longer tensioned, thus preventing overtensioning of the torsion spring 21 and resulting damage to or destruction of the torsion spring 21.

However, if the electric motor 4 is turned off, for example because of a power outage, a cut power line, or the like, the energy accumulated in the torsion spring 21 is released; the torsion spring 21 relaxes and thus turns the friction clutch 23 in a direction opposite to the direction of rotation during tensioning of the torsion spring 21. The rotary movement of the friction clutch 23 is transferred to the motor shaft 41 via the clutch element 22, from the motor shaft 41 to the motor shaft 42 and from there to the spindle nut 5. The spindle nut 5, which is now turning in a direction opposite to the direction of rotation before the motor was disconnected, produces an axial movement of the spindle 8 via the rolling elements or rollers 7 in a direction which is also opposite to the direction of movement before the motor 4 was turned off.

This ensures that, in a system driven by an electric motor, the spindle 8 is reset by a certain distance of its travel even in case of a power outage, whereby the travel is determined by the dimensions of the torsion spring 21 and the adhesion between the motor shaft 41 and the clutch element 22 that may be predefined, for example through the appropriate selection of the respective material.

Figure 2:
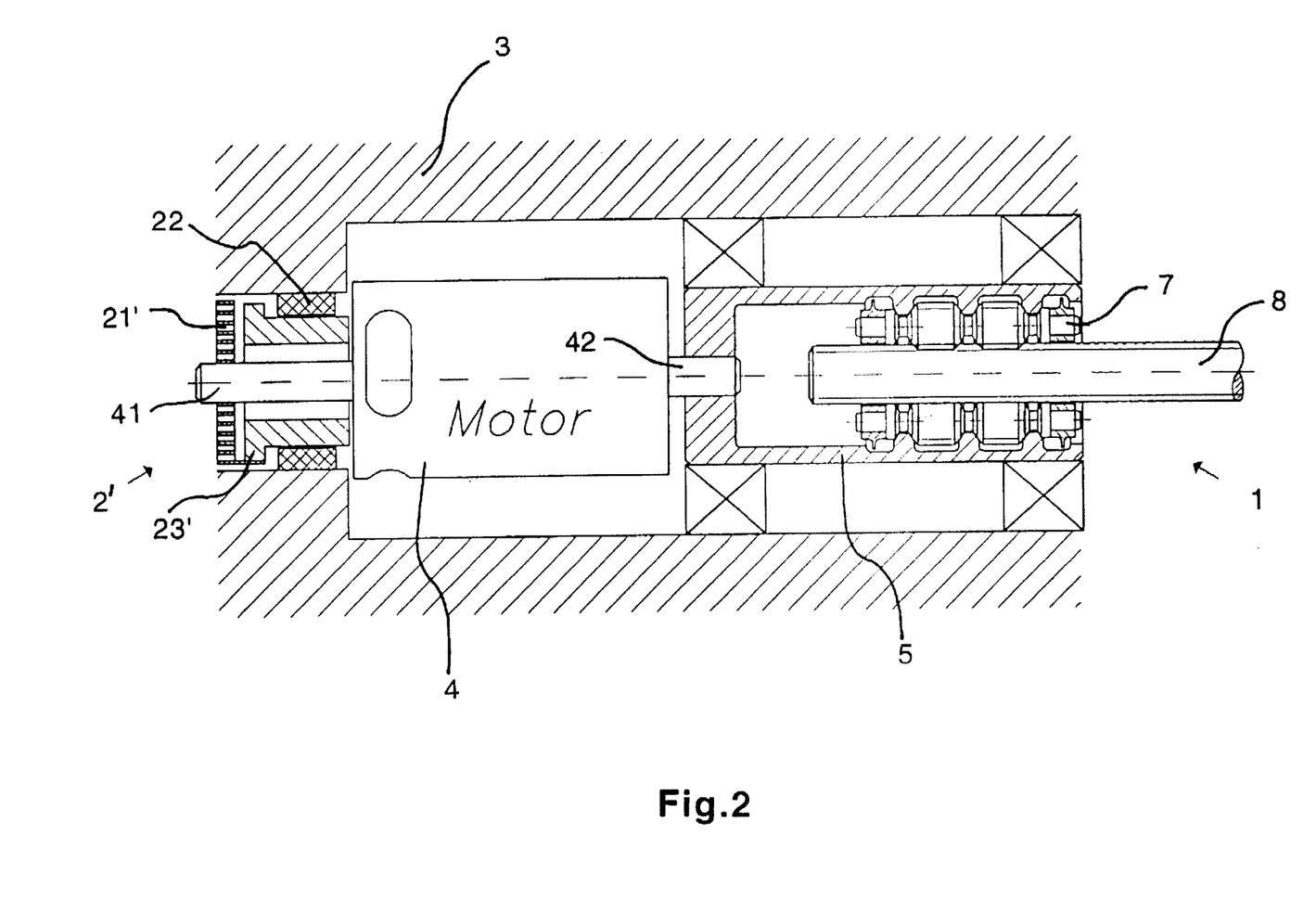

FIG. 2 shows a schematic sectional view of a second preferred design in which all elements with the exception of the reset device 2' correspond to the elements shown in FIG. 1. In FIG. 2, one end of the torsion spring 21' is firmly connected to the motor shaft 41 and the other end is firmly connected to the friction clutch 23' via a connecting element not shown in detail in FIG. 2, and the friction clutch 23' is connected to the casing 3 via the clutch element 22. This means that, based on the energy accumulated in the torsion spring 21', either a firm connection exists, or the friction clutch 23' slips.

A torque is introduced into the torsion spring 21' by the electric motor 4 via its shaft 41. After a certain number of rotations of the motor shaft 41, predetermined by the dimensions of the torsion spring 21' and the design of the clutch element 22, have been accumulated by the torsion spring, and the respective amount of energy has accumulated in the torsion spring 21', the static friction between the friction clutch 23' and the clutch element 22, as well as between the clutch element 22 and the casing 3, changes into a sliding friction so that further tensioning of the torsion spring 21' and damage to the same is no longer possible.

If the electric motor 4 is turned off, for example due to a power outage, the torsion spring 21' releases the energy accumulated in the torsion spring to the motor shaft 41 in a manner so that the rotation of the motor shaft 41 is reversed and the shaft is rotated in the opposite direction by the number of stored rotations. Analogous to the design in FIG. 1, the second design thus also ensures that the spindle 8 is moved in a direction opposite to its previous movement by a predefined length of travel after the motor is disconnected, i.e., the spindle is reset.

Figure 3:
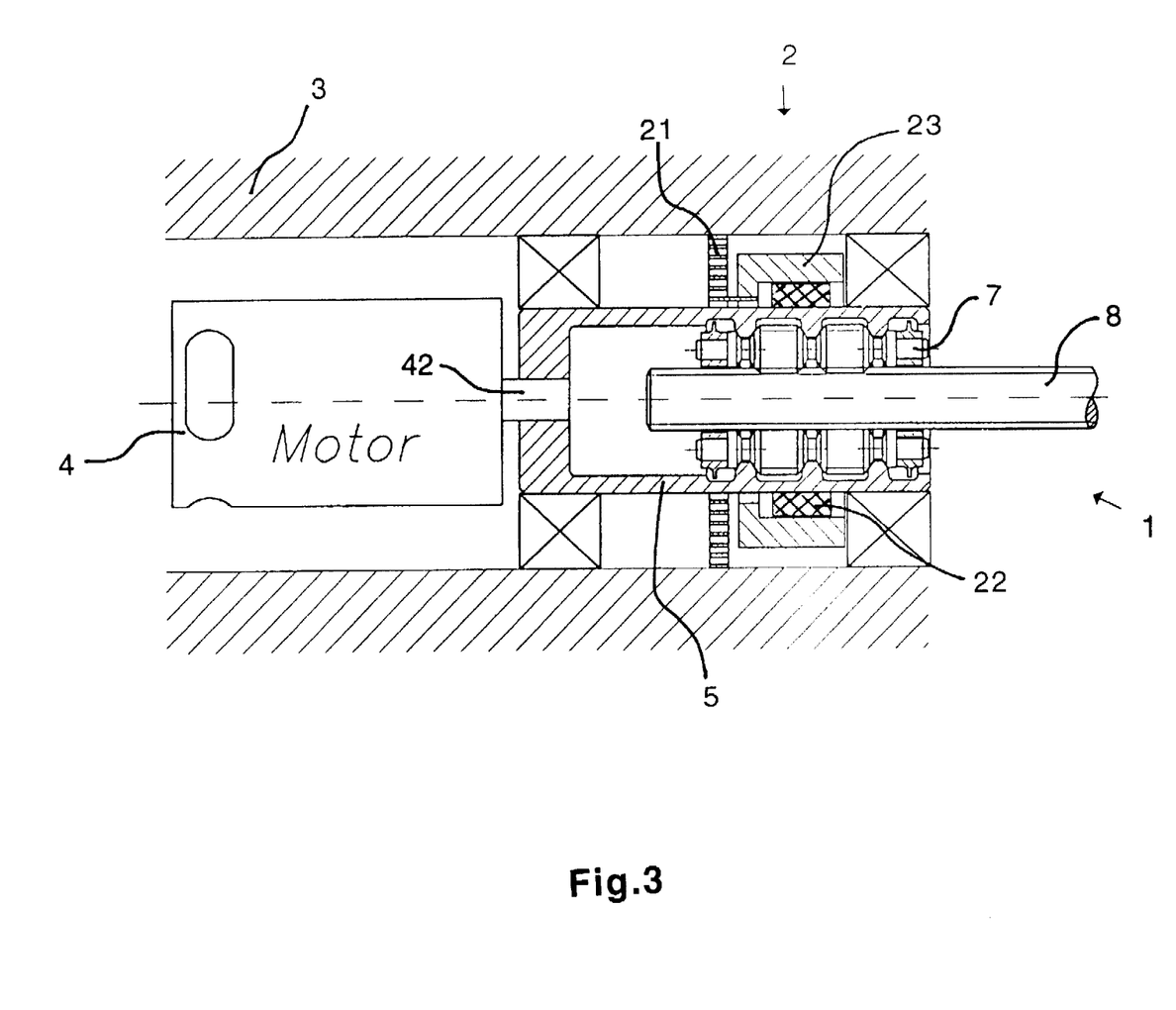

FIG. 3 shows a schematic sectional view of a third preferred embodiment or design, all elements of which, with the exception of the arrangement of the reset device 2, correspond to those shown in FIG. 1. The third design requires less space than the two designs shown in FIG. 1 and FIG. 2 since the reset device 2 is not located to the left of the motor 4, as in FIGS. 1 and 2, but between the spindle nut 5 and the casing 3.

In this design the torsion spring 21 is firmly connected to the casing 3, but not to the spindle nut 5. The connection to the spindle nut 5 is made via the friction clutch 23 which, in turn, is connected to the torsion spring 21, and via the clutch element 22 located between the friction clutch 23 and the spindle nut 5.

In the third embodiment, analogous to the two designs described above, the reset device 2 also releases its stored amount of energy, that may be predefined as described above, to the spindle nut 5, the rotary movement of which is then converted into an axial reset movement of the spindle 8 via the rolling elements or rollers 7.

Figure 4:
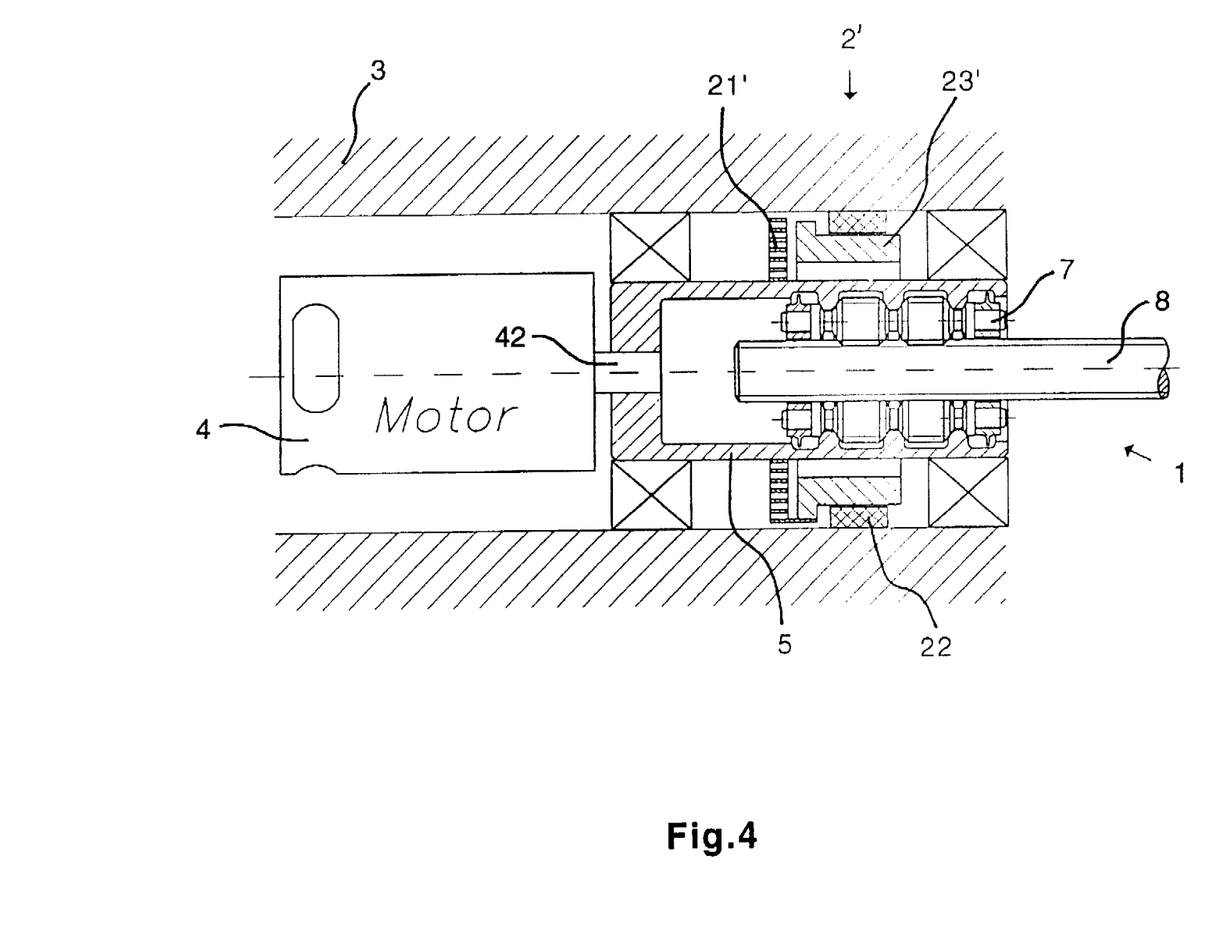

FIG. 4 shows a fourth preferred design or embodiment in which the reset device 2' is located between the spindle nut 5 and the casing 3, analogous to FIG. 3. The design of the reset device 2' corresponds to the design shown in FIG. 2. Accordingly, the torsion spring 21' is firmly connected to the spindle nut 5, which is connected to the motor shaft 42; the clutch element 22 is located between the friction clutch 23' and the casing 3.

FIGS. 5 through 8 show further preferred designs, in which the converter device 1' has been modified so that the motor shaft 42 is connected to the spindle 8'. The grooves 72 of the rolling elements or rollers 7 engage into the thread 81' of the spindle 8', and the grooves 71 on the outside of the rolling elements or rollers 7 correspond to grooves 51' formed on the interior of the spindle nut 5'. A rotary movement of the spindle 8' is thus converted into an axial movement of the spindle nut 5' via the rolling elements or rollers 7.

Figure 5:
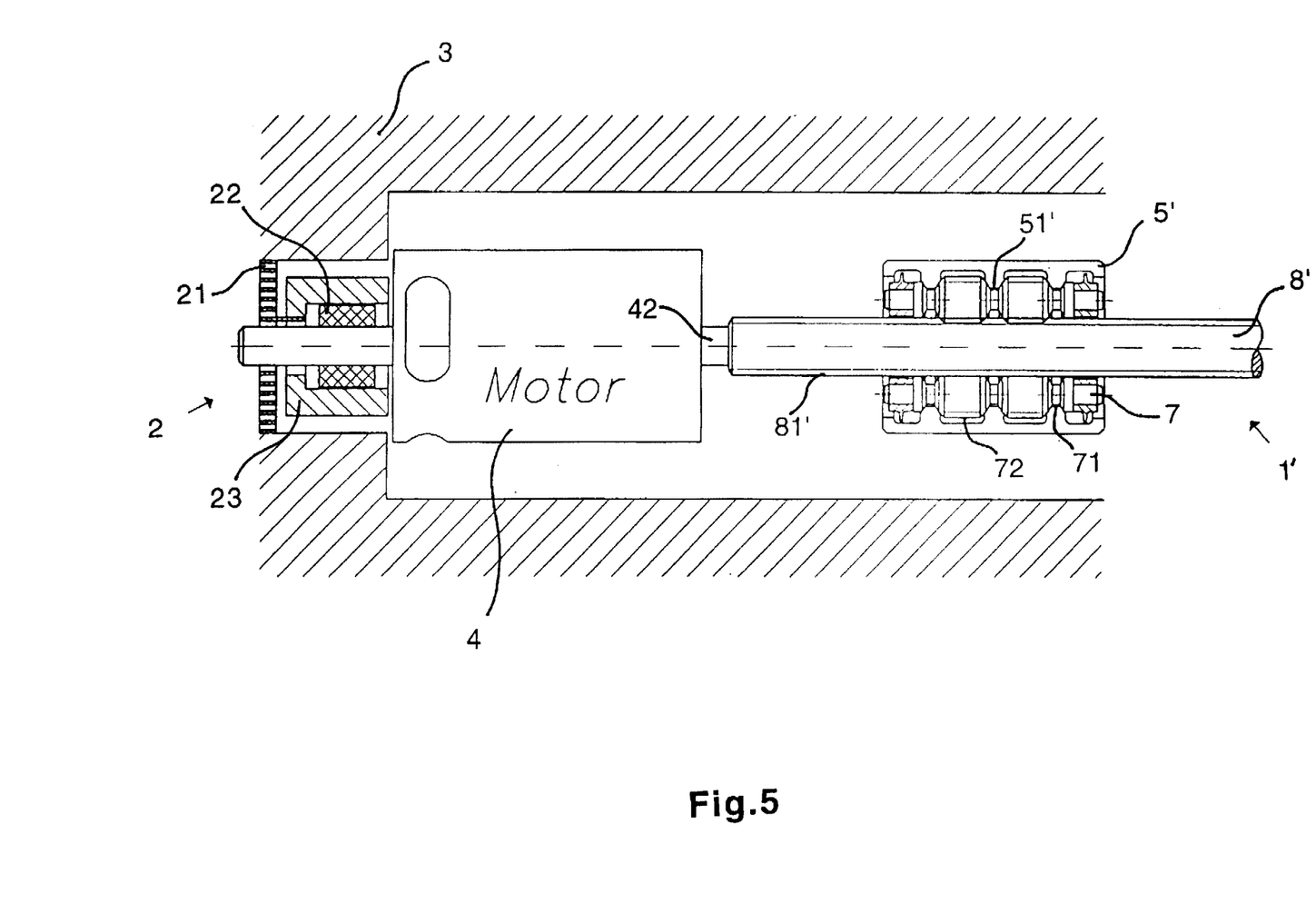
Figure 6:
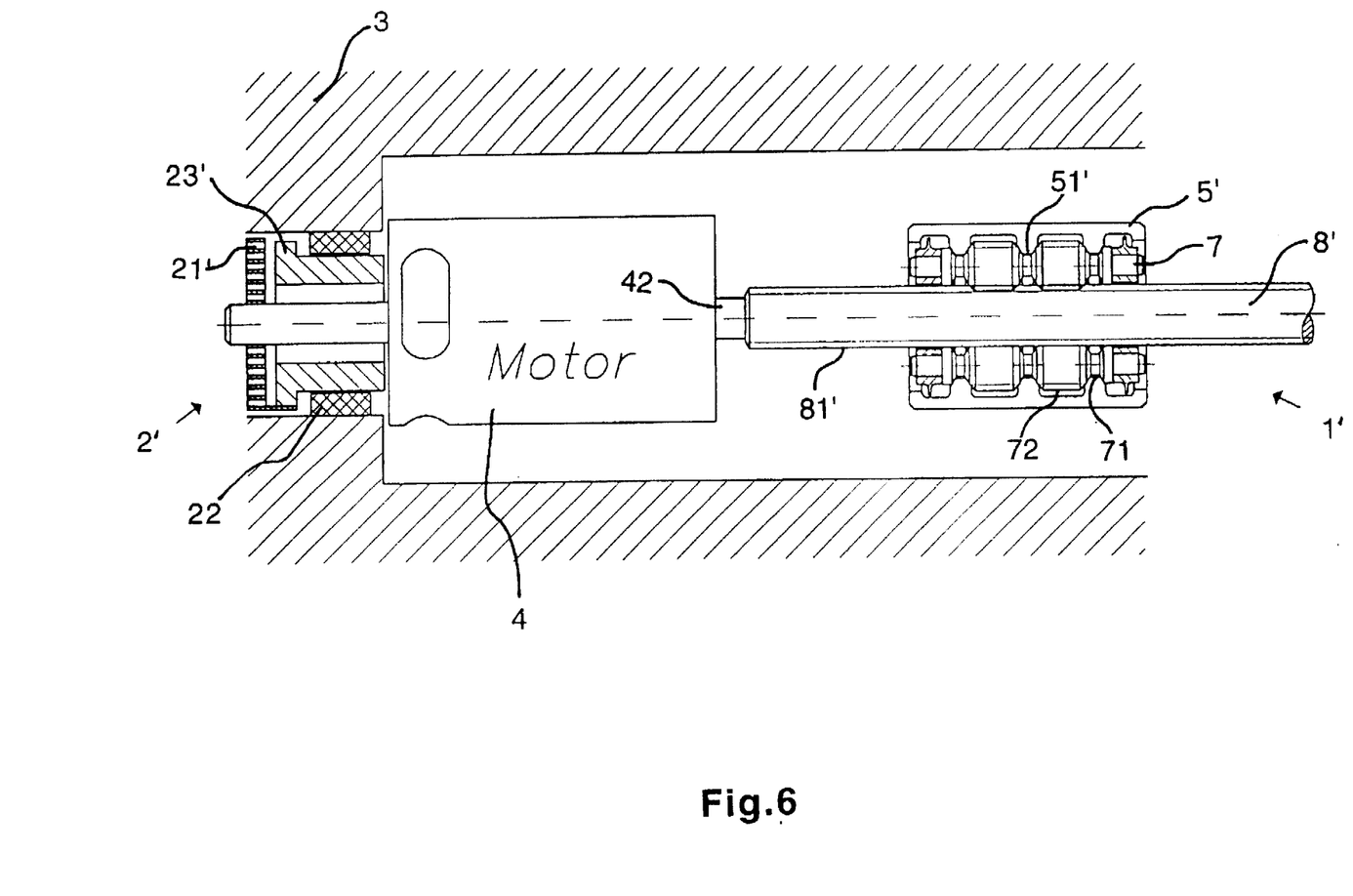

The reset devices 2 and 2' in FIGS.5 and 6, respectively, correspond to the reset devices 2 and 2' shown in FIGS.1 and 2, respectively. To reduce the amount of space required by the device, the reset devices 2 and 2' as shown in FIGS.7 and 8, have been designed like the reset devices 2 and 2' in FIGS.5 and 6, but installed to the right of the electric motor in FIGS.7 and 8.

FIGS. 9 through 12 show schematic sections of preferred designs or embodiments in which the actuation of a converter device 1" is effected by the motor 4 and transferred via its shaft 42 and a connecting element 9 onto the rolling elements or rollers 7. The rolling elements or rollers 7 are run rotatably inside the spindle nut 5", which is firmly connected to the casing 3, via the grooves 51" and 71 so that they cannot be shifted in an axial direction. The rotation of the rolling elements or rollers 7, which are connected to the motor shaft 42 via the connecting element 9, around the main axis of the device, as well as around the axis of the individual rolling elements or rollers 7, produces an axial shifting of the spindle 8.

Figure 7:
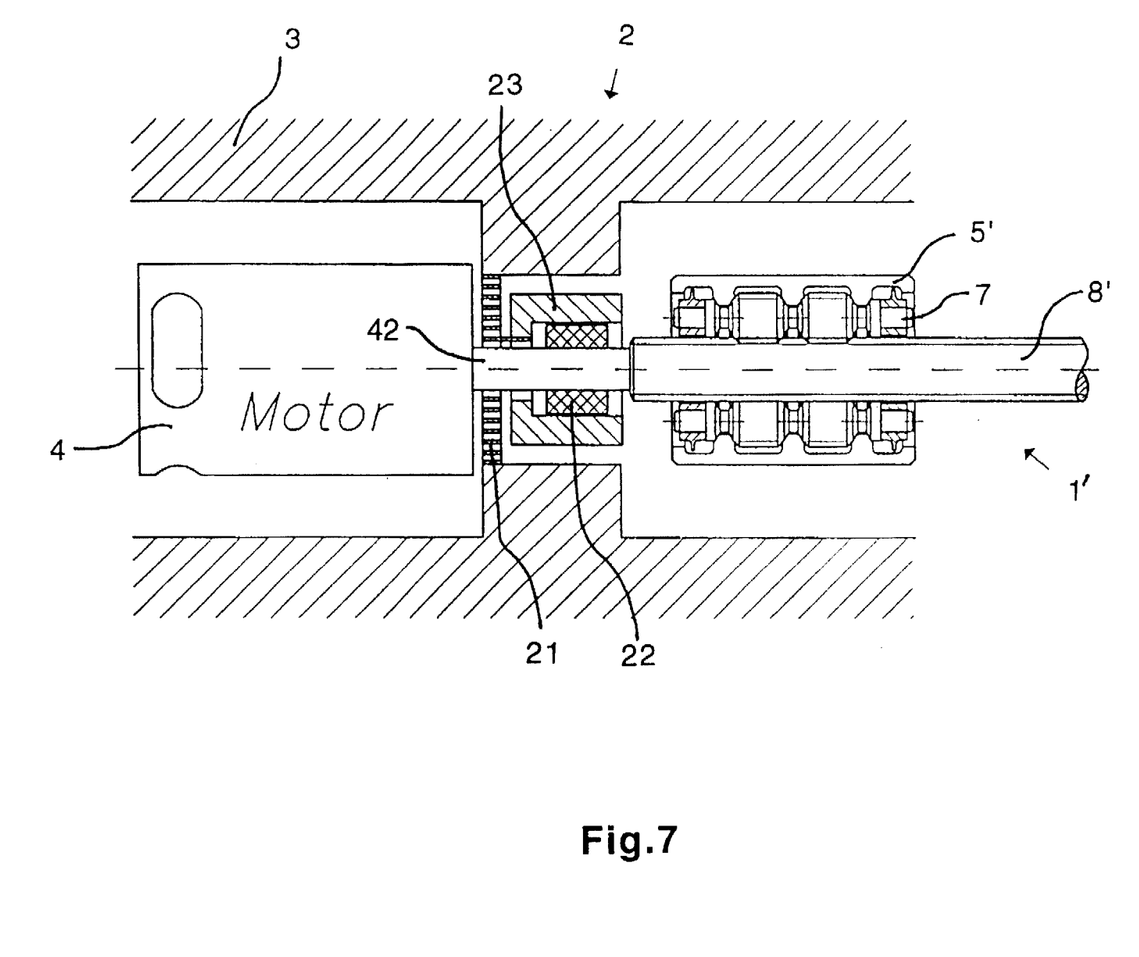
Figure 8:
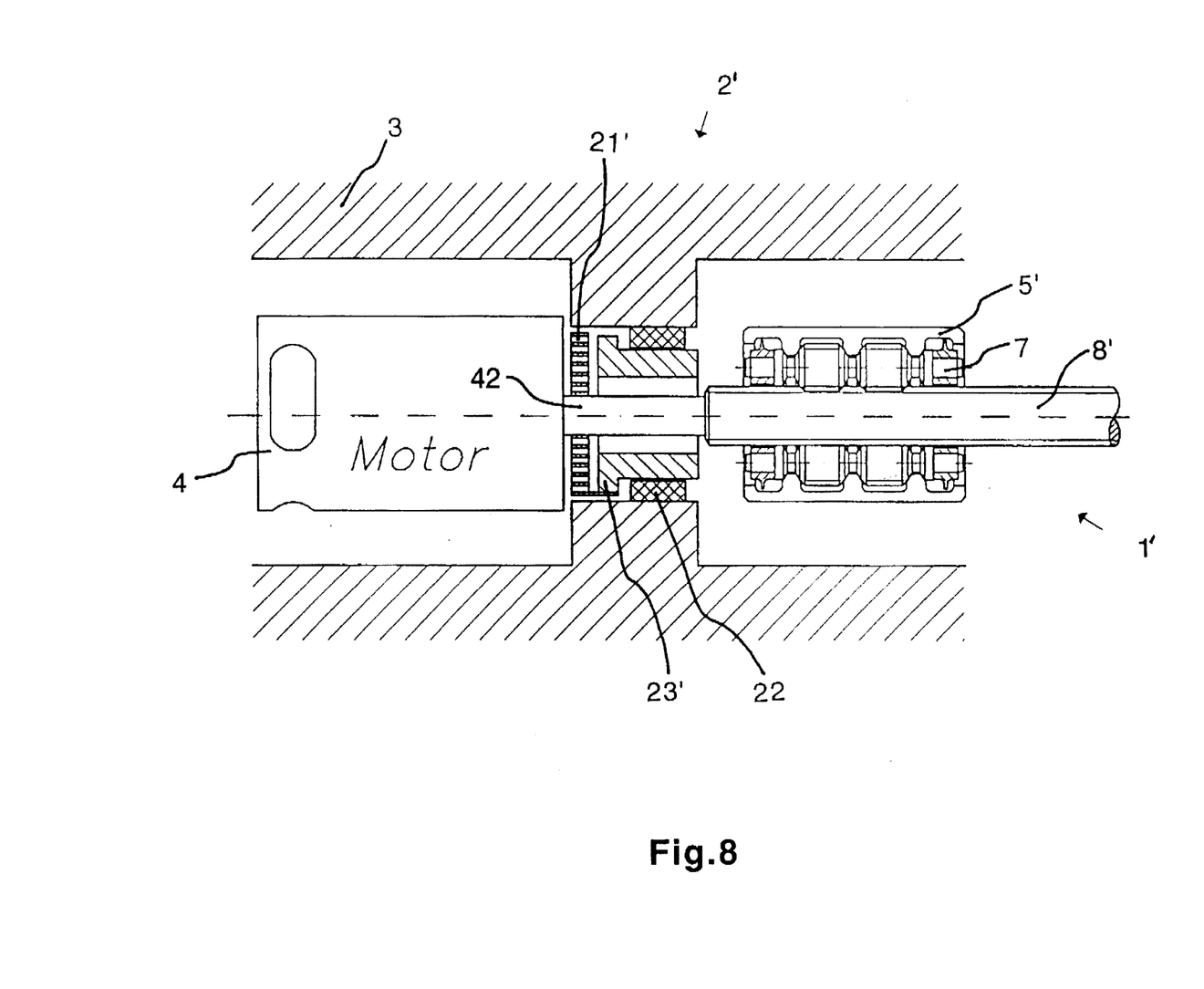
Figure 9:
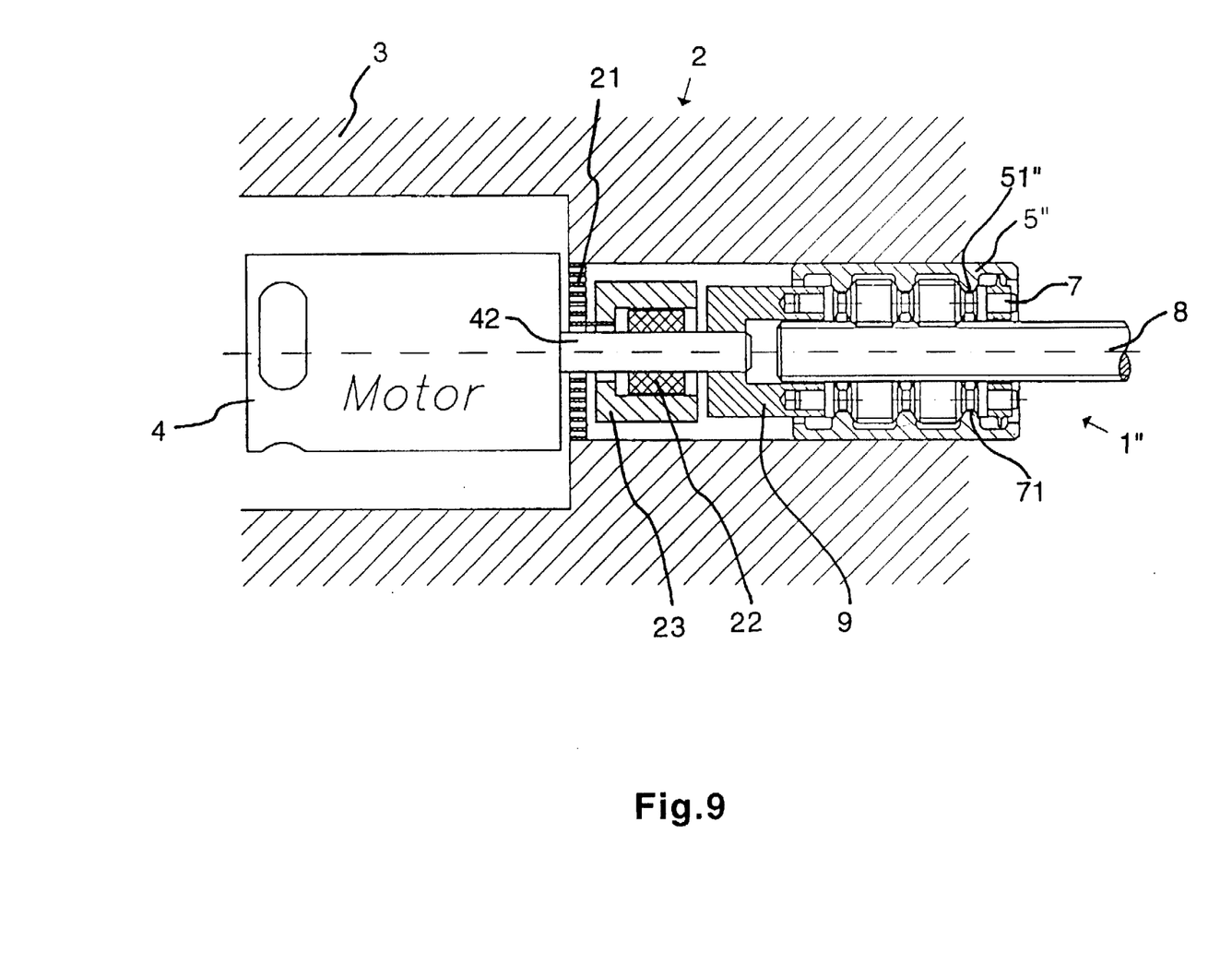
Figure 10:
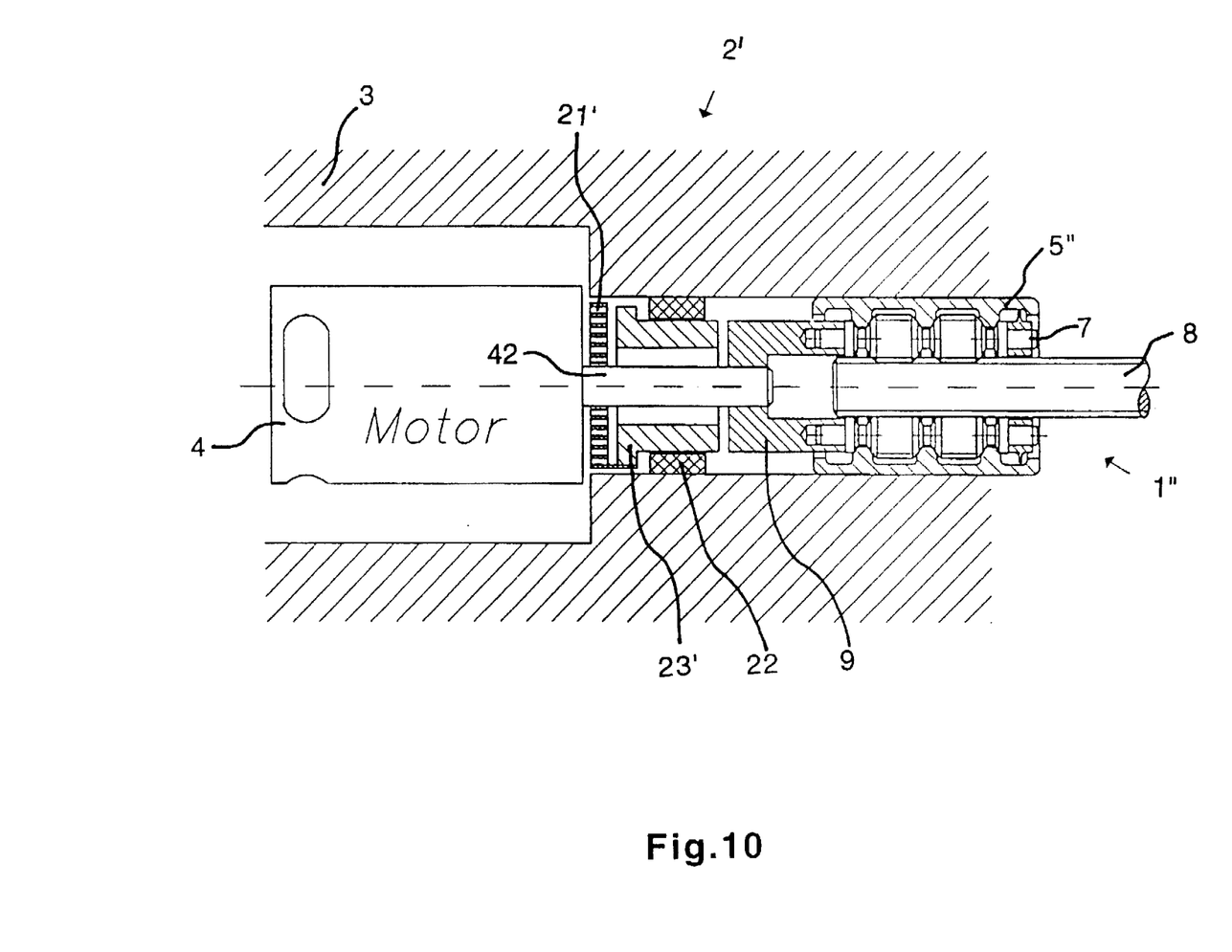
Figure 11:
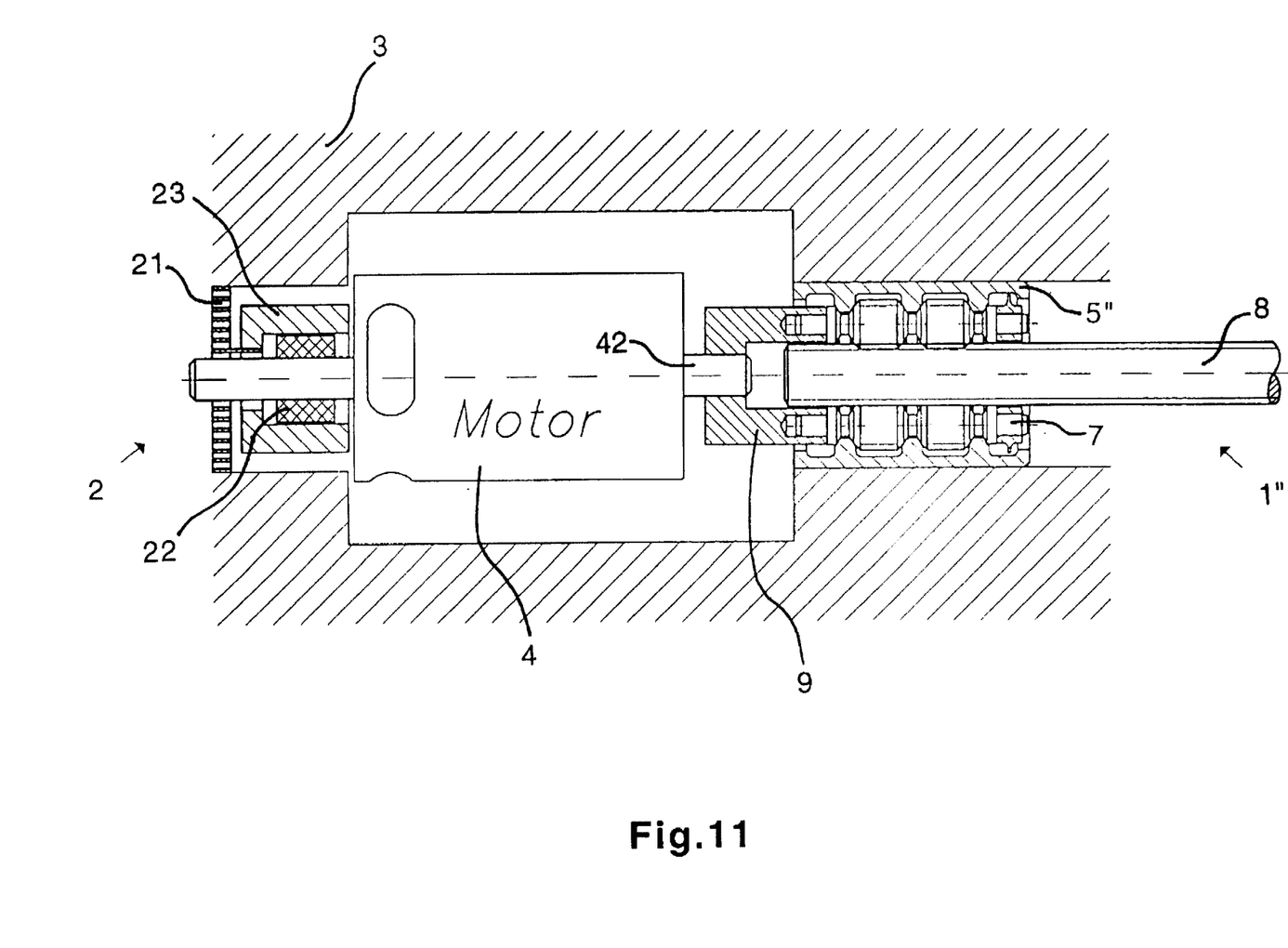
Figure 12:
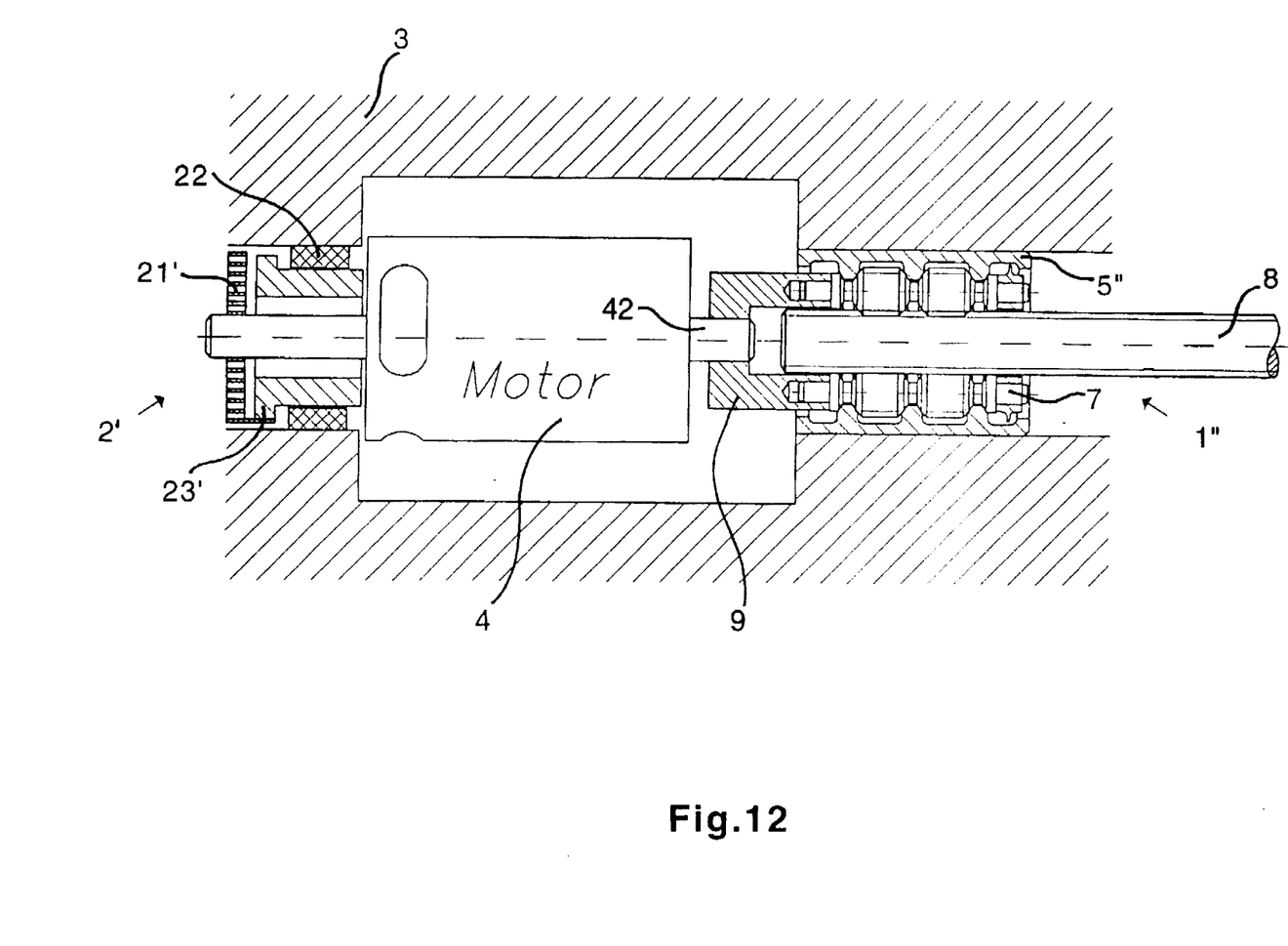

The design of the reset devices 2 and 2', respectively in FIGS. 9 and 10 corresponds to the design of the reset devices 2 and 2', respectively in FIGS.7 and 8. In the designs shown in FIGS.11 and 12, the arrangement of the reset devices 2 and 2', respectively, corresponds to the arrangement of the reset devices 2 and 2', respectively, in FIGS.1 and 2, and FIGS.5 and 6, respectively.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

What is claimed is:

1. A rotary-to-axial converter (1) for converting rotary movement into axial movement, the converter being disposed in a casing (3); the converter comprising:
   a rotary-motion drive unit (4);
   a spindle (8, 8') including a thread (81);
   a spindle nut (5, 5', 5") including spindle grooves (51), the spindle nut (5, 5', 5") surrounding the spindle (8, 8');
   a plurality of rolling elements or rollers (7) interposed between the spindle and the spindle nut, each of the rollers (7) including
      a groove profile (72) mating with the thread (81) of the spindle (8, 8') and
      roller grooves (71) mating with the spindle grooves (51) formed on the interior of the spindle nut (5, 5', 5");
   means for coupling the drive unit to at least one of the spindle (8, 8'), the spindle nut (5, 5', 5"), and the rollers (7), whereby the converter device is drivable by the drive unit;
   a device for relative repositioning, rotatably coupling the casing to a remainder of the converter, the device for relative repositioning comprising a mechanical energy accumulator (21, 21') and an energy delimiter (22, 23; 22', 23').

2. The converter according to claim 1, wherein the drive unit comprises an electric motor.

3. The converter according to claim 1, wherein the means for coupling the drive unit includes a connection element (9) interposed between the drive unit and the rollers (7), whereby the converter device is drivable via the rollers (7).

4. The converter according to claim 1, wherein the mechanical energy accumulator (21, 21') is fastened to the casing (3) and the energy delimiter (22, 23; 22', 23') is located between the energy accumulator (21') and the casing (3).

5. The converter according to claim 1, wherein the mechanical energy accumulator (21, 21') is fastened to the drive unit (4) by means of an adapter piece (41; 42, 5; 42), and the energy delimiter (22, 23; 22, 23') is located between the energy accumulator (21) and the adapter piece (41; 42, 5; 42).

6. The device according to claim 1, wherein energy is transferred between the drive unit (4) and the energy accumulator (21) via the energy delimiter (22, 23), and the energy accumulator (21) is fastened to the casing (3).

7. The device according to claim 6, wherein the energy accumulator (21') is firmly connected to the energy delimiter (22, 23') and the energy delimiter is fastened to the casing (3).

8. The device according to claim 1, wherein the spindle nut (5) is driven and energy is transmitted between the spindle nut (5) and the energy accumulator (21) via the energy delimiter (22, 23), and the energy accumulator (21) is fastened to the casing (3).

9. The device according to claim 1, wherein the mechanical energy accumulator (21, 21') comprises a torsion spring and the energy delimiter (22, 23; 22, 23') comprises a friction clutch with a clutch element.

10. The device according to claim 1, comprising means for adjusting an amount of energy accumulated in the mechanical energy accumulator (21, 21') and automatically releasing the energy for reset when the drive unit (4) is disconnected from the power source.

11. The device according to claim 1, comprising means for connecting the casing (3) and the spindle (8) into a brake system.

12. In a system including a hydraulic or pneumatic fluid power linear actuator, a method comprising:

(a) providing a rotary-to-axial converter (1) for converting rotary movement into axial movement, the converter comprising:
  a casing (3);
  a rotary-motion drive unit (4);
  a spindle (8, 8') including a thread (81);
  a spindle nut (5, 5', 5") including spindle grooves (51), the spindle nut (5, 5', 5") surrounding the spindle (8, 8');

a plurality of rolling elements or rollers (7) interposed between the spindle and the spindle nut, each of the rollers (7) including
  a groove profile (72) mating with the thread (81) of the spindle (8, 8') and
  roller grooves (71) mating with the spindle grooves (51) formed on the interior of the spindle nut (5, 5', 5");

means for coupling the drive unit to at least one of the spindle (8, 8'), the spindle nut (5, 5', 5"), and the rollers (7), whereby the converter device is drivable by the drive unit;

a device for relative repositioning, rotatably coupling the casing to a remainder of the converter, the device for relative repositioning comprising a mechanical energy accumulator (21, 21') and an energy delimiter (22, 23; 22', 23'); and (b) removing the linear actuator from the system and replacing the linear actuator with the converter.

* * * * *